Figure 1:
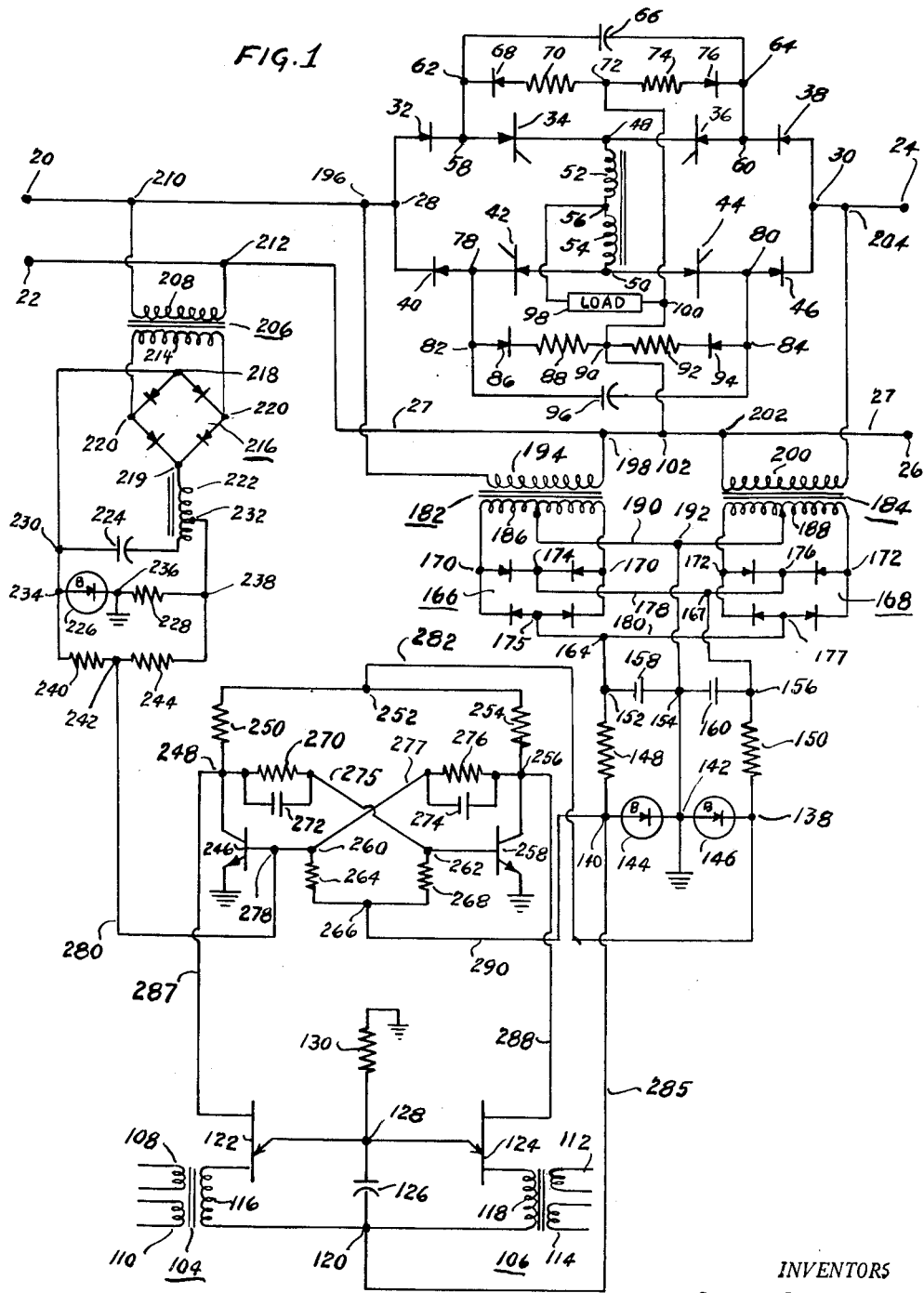

INVENTORS
OWEN E. REINERT
RICHARD T. DALY JR.
BY
Ray Eilers
ATT'Y.

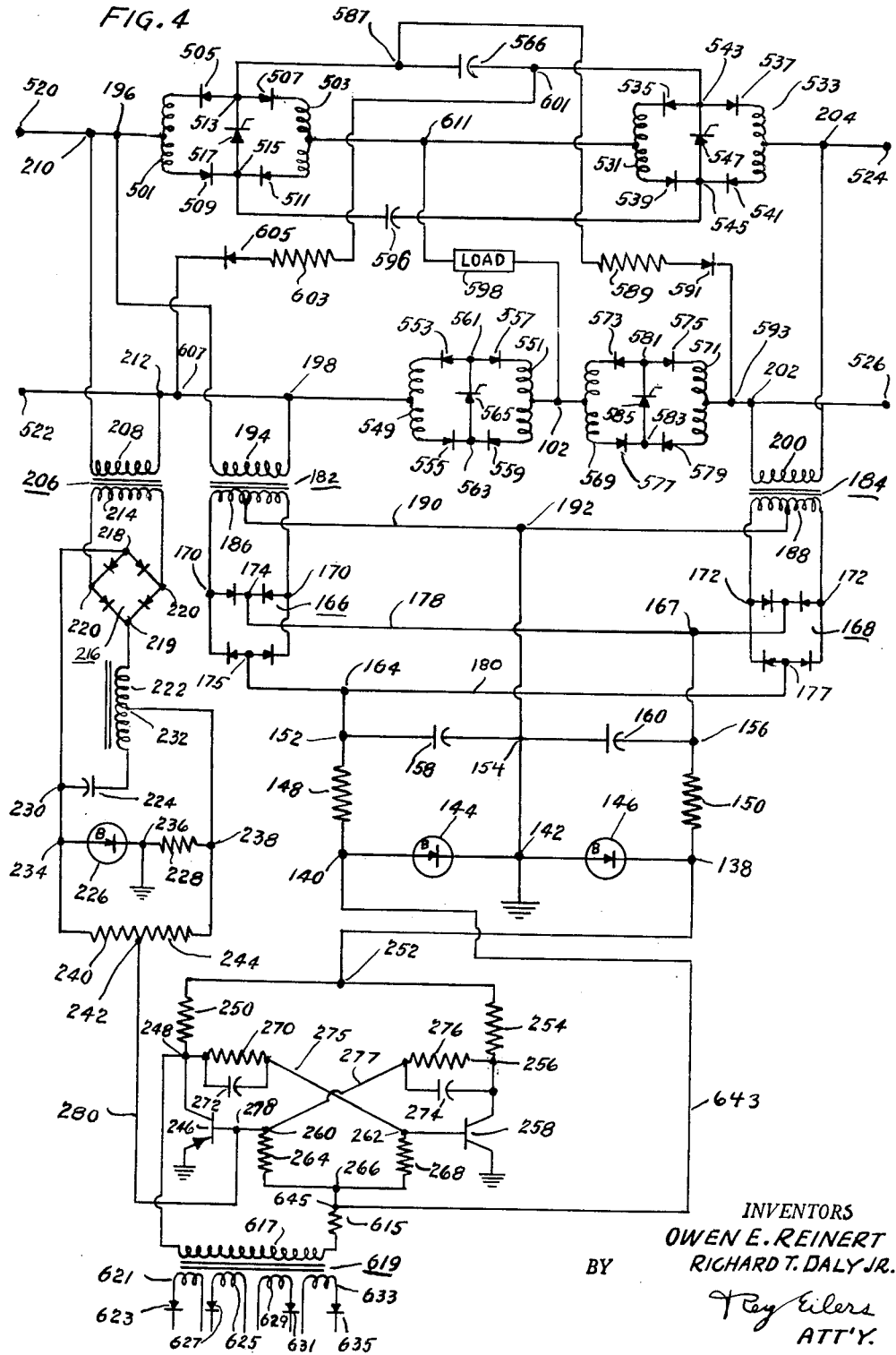

United States Patent Office 3,201,592
Patented Aug. 17, 1965

3,201,592
CONTROL SYSTEM FOR TRANSFERRING A LOAD FROM ONE POWER SOURCE TO A SECOND POWER SOURCE
Owen E. Reinert, St. Louis County, and Richard T. Daly, Jr., Town and Country, Mo., assignors to Sperry Rand Corporation, a corporation of Delaware
Filed July 24, 1961, Ser. No. 126,187
20 Claims. (Cl. 307—64)

This invention relates to improvements in control systems. More particularly, this invention relates to improvements in control systems which can connect a load to one power source and which can automatically transfer that load to a second power source in the event the said one power source fails.

It is, therefore, an object of the present invention to provide a control system which can connect a load to one power source and which can automatically transfer that load to a second power source in the event the said one power source fails.

In some electrical installations it is necessary that a standby power source be provided, and that the load which is connected to a normal power source be automatically and promptly transferred to that standby power source in the event that normal power source fails. Where the normal and standby power sources are D.C. power sources, it is not overly difficult to provide a control system which can automatically and promptly transfer the load from the normal power source to the standby power source when that normal power source fails. However, where the normal and standby power sources are A.C. power sources, it is not easy to provide a control system which can automatically and promptly transfer the load from the normal power source to the standby power source when that normal power source fails. Some control systems have been proposed to automatically transfer a load from a normal A.C. power source to a standby A.C. power source when that normal A.C. power source fails, but most of those control systems utilized mechanical contactors to effect the transference of the load from the normal A.C. power source to the standby A.C. power source. While such control systems can effect the desired transference of the load from the normal A.C. power source to the standby A.C. power source, the mechanical inertia and the electrical impedance of those mechanical contactors prevent prompt transference of the load from the normal A.C. power source to the standby A.C. power source. As a result, control systems which utilize mechanical contactors to effect the transference of the load from the normal A.C. power source to the standby A.C. power source can not avoid losses of power to the loads for appreciable periods during the transference of those loads from the normal A.C. power sources to the standby A.C. power sources. Even where special mechanical contactors are used in such control systems, those control systems can not avoid losses of power to the loads for periods of from fifty to one hundred milliseconds. While the loss of power to the loads in some installations for such relatively short periods may be inconsequential, the loss of power to the loads in other installations for such relatively short periods could be so serious as to be wholly unacceptable. Consequently, it would be desirable to have a control system which could connect a load to a normal A.C. power source and that could automatically transfer that load to a standby A.C. power source, and that could do so while limiting the loss of power to the load to a period of less than fifty milliseconds. The present invention provides such a control system; and it is, therefore, an object of the present invention to provide a control system which can connect a load to a normal A.C. power source and which can automatically transfer that load to a standby A.C. power source, and which can limit the loss of power to the load to a period of less than fifty milliseconds.

To limit the periods of power loss to the loads to such extremely small values, the present invention provides a control system that does not utilize mechanical contactors. In fact, that control system does not use any moving parts at all. As a result, that control system is able to transfer a load from a normal A.C. power source to a standby A.C. power source without an objectionable loss of power to the load. It is, therefore, an object of the present invention to provide a control system which can transfer a load from a normal A.C. power source to a standby A.C. power source and which does not utilize any moving parts.

The control system provided by the present invention utilizes controlled rectifiers to connect a load to a normal A.C. power source while disconnecting that load from a standby A.C. power source; and then uses those controlled rectifiers to connect that load to that standby A.C. power source when that normal A.C. power source fails. By using controlled rectifiers, the control system of the present invention minimizes the duration of the period of less of power to the load. Also by using controlled rectifiers, the control system of the present invention provides a transference of the load which is unaffected by differences between the phases of the two A.C. power sources, which is unaffected by the power factor of the load, and which is unaffected by any non-linear characteristics of the load. As a result, the control system provided by the present invention can provide prompt, automatic and precise transference of the load from the normal A.C. power source to the standby A.C. power source. It is, therefore, an object of the present invention to provide a control system which uses controlled rectifiers to connect a load to a normal A.C. power source while disconnecting that load from a standby A.C. power source; and then uses those controlled rectifiers to connect that load to that standby A.C. power source when that normal A.C. power source fails.

During the transference of the load from the normal A.C. power source to the standby A.C. power source, cross currents may tend to flow between the two A.C. power sources. It would be undesirable to permit substantial flow of such cross currents; and the control system provided by the present invention is able to prevent substantial flow of such cross currents. It is, therefore, an object of the present invention to provide a control system that can transfer a load from a normal A.C. power source to a standby A.C. power source, and that can prevent substantial flow of cross currents between the two A.C. power sources during that transference.

The control system provided by the present invention utilizes capacitors and an inductor to help effect the desired transference of a load from a normal A.C. power source to a standby A.C. power source. While the normal A.C. power source is supplying power to the load, a charge of a predetermined polarity will be established across the capacitors; and if that normal A.C. power source fails, the control system will enable the charge across those capacitors to "blow out" the controlled rectifiers which normally connect the normal A.C. power source to the load. Simultaneously, the controlled rectifiers which normally disconnect the load from the standby A.C. power source will be rendered conductive; and hence the load will be transferred to that standby A.C. power source with virtually no loss of power. During the transference of the load from the normal A.C. power source to the standby A.C. power source, the inductor will minimize cross currents between the two A.C. power sources. In this way, the control system provided by the present invention is able to automatically and promptly transfer the load from the normal A.C. power source to the standby A.C. power source while minimizing cross currents between the two A.C. power sources. It is, therefore, an object of the present invention to provide a control system wherein capacitors and an inductor are used to help effect transference of a load from a normal A.C. power source to a standby A.C. power source.

Other and further objects and advantages of the present invention should become apparent from an examination of the drawing and accompanying description.

In the drawing and accompany description, several preferred embodiments of the present invention are shown and described but it is to be understood that the drawing and accompanying description are for the purpose of illustration only and do not limit the invention and that the invention will be defined by the appended claims.

Figure 2:
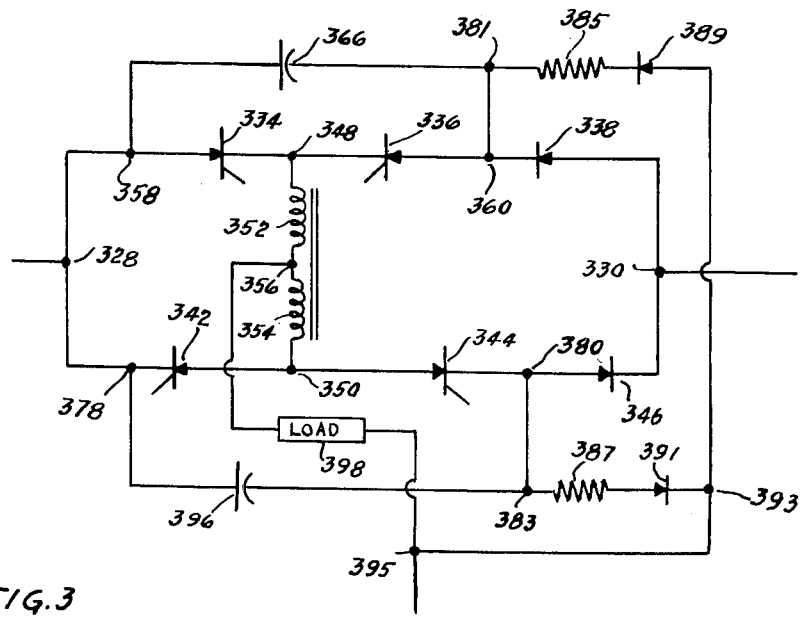
Figure 3:
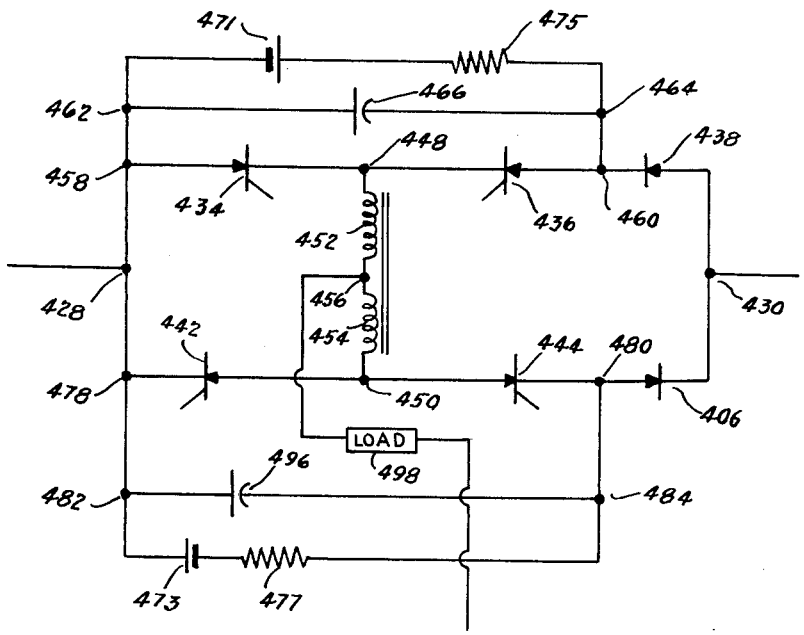

In the drawing,

FIG. 1 is a schematic diagram of one preferred embodiment of control system that is made in accordance with the principles and teachings of the present invention, FIG. 2 is a schematic diagram of a substitute for the transfer unit of the control system of FIG. 1, FIG. 3 is a schematic diagram of a further substitute for the said transfer unit of the control system of FIG. 1, and FIG. 4 is a schematic diagram of another preferred embodiment of control system that is made in accordance with the principles and teachings of the present invention.

Referring to the drawing in detail, the numerals 20 and 22 denote terminals which are connectable to a normal A.C. power source. In one preferred embodiment of the present invention, that A.C. power source is a one hundred and fifteen volt, sixty cycle, single phase, A.C. power source. The numerals 24 and 26 denote terminals which are connectable to a standby A.C. power source; and in the said preferred embodiment of the present invention, that standby A.C. power source also is a one hundred and fifteen volt, sixty cycle, single phase, A.C. power source.

The terminals 22 and 26 are directly connected by a conductor 27; but the terminals 20 and 24 are isolated from each other by a transfer unit which includes four controlled rectifiers 34, 36, 42 and 44, eight diodes 32, 38, 40, 46, 68, 76, 86 and 94, two capacitors 66 and 96, two inductors 52 and 54, and four resistors 70, 74, 88 and 92. The controlled rectifiers 34, 36, 42 and 44 are preferably silicon controlled rectifiers, because such controlled rectifiers are very reliable and are capable of handling large currents. The inductors 52 and 54 are shown as two separate coils wound upon the same core, but those inductors can be a center-tapped inductor.

The diode 32 and a junction 58 connect the anode of the controlled rectifier 34 to a junction 28 which, in turn, is connected to the terminal 20 by junctions 196 and 210. The anode of the controlled rectifier 36 is connected to a junction 30 by a junction 60 and the diode 38; and the junction 30 is, in turn, connected to the terminal 24 by a junction 204. The cathodes of the controlled rectifiers 34 and 36 are connected together by a junction 48. The cathode of the controlled rectifier 42 is connected to the junction 28 by a junction 78 and the diode 40. The cathode of the controlled rectifier 44 is connected to the junction 30 by a junction 80 and the diode 46. The anodes of the controlled rectifiers 42 and 44 are connected together by a junction 50. The junctions 48 and 50 are connected together by the two inductors 52 and 54 and by a junction 56. Junctions 62 and 64 connect the opposite terminals of the capacitor 66 to the junctions 58 and 60; and the junctions 82 and 84 connect the opposite terminals of the capacitor 96 to the junctions 78 and 80.

The diode 68, the resistor 70, a junction 72 and a junction 100 connect the junction 62 to one side of a load 98; and the diode 76, the resistor 74, and the junctions 72 and 100 connect the junction 64 to that same side of the load 98. The diode 86, the resistor 88, a junction 90, and the junction 100 connect the terminal 82 to the said one side of the load 98; and the diode 94, the resistor 92, and the junctions 90 and 100 connect the junction 84 to that same side of the load 98. The other side of the load 98 is directly connected to the junction 56. The junction 100 is connected to both the normal and the standby A.C. power sources by the junction 90, a junction 102, and the conductor 27.

The numeral 104 adjacent the bottom of FIG. 1 generally denotes a transformer which has a primary winding 116 and two secondary windings 108 and 110. The numeral 106 adjacent the bottom of FIG. 1 generally denotes a second transformer which has a primary winding 118 and two secondary windings 112 and 114. The two terminals of the secondary winding 108 are connected to the gate and the cathode of the controlled rectifier 34; and the two terminals of the secondary winding 110 are connected to the gate and cathode of the controlled rectifier 42. The two terminals of the secondary winding 112 are connected to the gate and cathode of the controlled rectifier 36; and the two terminals of the secondary winding 114 are connected to the gate and cathode of the controlled rectifier 44. The lower terminals of the primary windings 116 and 118 are connected together by a junction 120. The upper terminal of the primary winding 116 is connected to the first base of a unijunction transistor 122; and the upper terminal of the primary winding 118 is connected to the first base of a unijunction transistor 124. The emitters of the unijunction transistors 122 and 124 are connected together by a junction 128; and that junction is grounded through a resistor 130. The upper terminal of a capacitor 126 is connected to the junction 128; and the lower terminal of that capacitor is connected to the junction 120, and thus to the lower terminals of the primary windings 116 and 118. The unijunction transistor 124 and the capacitor 126 can, under certain conditions, serve as a signal generator, and the transformer 106 can couple the signals from that signal generator to the gates of the controlled rectifiers 36 and 44. The unijunction transistor 122 and the capacitor 126 will normally act as a signal generator, and the transformer 104 can couple the signals from that signal generator to the gates of the controlled rectifiers 34 and 42.

The junction 120 is connected to a terminal 140 by a conductor 285; and a Zener diode 144 connects the terminal 140 with a grounded terminal 142. A second Zener diode 146 connects the grounded terminal 142 with a terminal 138. The terminals 138, 140 and 142 are the output terminals of a D.C. auctioneering circuit; and the terminal 138 is positive relative to ground while the terminal 140 is negative relative to ground. The D.C. auctioneering circuit includes transformers 182 and 184, full wave bridge rectifiers 166 and 168, capacitors 158 and 160, and resistors 148 and 150. The primary winding of the transformer 182 is denoted by the numeral 194, and it has the terminals thereof connected to the terminals 20 and 22 by junctions 196 and 198, respectively. The primary winding of the transformer 184 is denoted by the numeral 200, and it has the terminals thereof connected to the terminals 24 and 26 by the junctions 204 and 202, respectively. The secondary windings 186 and 188, respectively, of the transformers 182 and 184 are center-tapped; and the end terminals of the secondary winding 186 are connected to the input terminals 170 of the bridge rectifier 166 while the end terminals of the secondary winding 188 are connected to the input terminals 172 of the bridge rectifier 168. The center-taps of the secondary windings 186 and 188 are connected together by a conductor 190, and are connected to ground by junctions 192 and 154 and terminal 142. The output terminal 174 of the bridge rectifier 166 is connected to the output terminal 176 of the bridge rectifier 168 by a conductor 178; and those output terminals are connected to the terminal 138 by junctions 167 and 156 and resistor 150. The output terminal 175 of the bridge rectifier 166 and the output terminal 177 of the bridge rectifier 168 are connected together by a conductor 180; and those terminals are connected to the terminal 140 by junctions 164 and 152 and resistor 148. Capacitor 158 is connected intermediate the junctions 152 and 154, and capacitor 160 is connected intermediate the junctions 154 and 156. The capacitors 158 and 160 serve to filter the output of the D.C. auctioneering circuit. The resistors 148 and 150 limit the current that can flow through the Zener diodes 144 and 146. The D.C. auctioneering circuit is intended to supply a predetermined value of D.C. voltage to the terminals 138 and 140 as long as the voltage of either the normal A.C. power source or the standby A.C. power source is normal.

The numeral 206 generally denotes a transformer which has the primary winding 208 thereof connected to the junction 20 by the junction 210 and the junction 22 by a junction 212. The secondary winding 214 of that transformer is connected to the input terminals 220 of a full wave bridge rectifier 216. The output terminal 219 of that bridge rectifier is connected to one terminal of a filter which includes an inductor 222 and a capacitor 224; and the output terminal 218 of the bridge rectifier is connected to the other terminal of that filter by a junction 230. That junction and junctions 234, 232 and 238 connect a serially-connected resistor 228 and a Zener diode 226 in parallel with the capacitor 224 plus part of the inductor 222 of the filter, and thus across the output of the bridge rectifier 216. A grounded terminal 236 is provided intermediate the cathode of the Zener diode 226 and the resistor 228. Resistors 240 and 244 also are connected in parallel with the capacitor 224 plus the said part of the inductor 222 of the filter, and hence across the output of the bridge certifier 216, by the junctions 230, 234, 232 and 238. Those resistors have the adjacent terminals thereof connected by a terminal 242; and those resistors will divide the output voltage of the bridge rectifier 216 according to a predetermined, fixed ratio, irrespective of whether that voltage remains within its intended limits or falls below the lower of those limits. The Zener diode 226 will, under normal conditions, maintain a predetermined voltage between junction 234 and ground; and hence if the voltage across the output of the bridge rectifier 216 falls below the level of the lower of its intended limits, that reduction in voltage will have to appear across the resistor 228 rather than across the Zener diode 226. As a result, the Zener diode 226 and the resistors 228, 240 and 244 are able to coact with the transformer 206 and the bridge rectifier 216 to constitute a detector which is responsive to the output voltage of the normal A.C. power source. As long as the voltage across that normal A.C. power source remains within its intended limits, the terminal 242 will be positive relative to the grounded terminal 236.

The inductor 222 and the capacitor 224 constitute a notch filter which will minimize the ripple in the D.C. output voltage of the bridge rectifier 216. The location of the junction 232 on the inductor 222 is selected so the notch filter will be able to cancel the second harmonic components of the output of the bridge rectifier 216 and will also be able to attenuate the higher frequency harmonics of that output. The overall result is that the ripple in the D.C. output voltage of the bridge rectifier 216 will be greatly attenuated without an undue time lag in the detection of changes in the output voltage of the normal A.C. power source.

The numeral 246 in the lower left-hand portion of FIG. 1 denotes an NPN transistor which has the emitter thereof grounded and which has the collector thereof connected to a junction 248. A resistor 250, a junction 252, a resistor 254 and a junction 256 connect the junction 248 to the collector of a second NPN transistor 258 which has the emitter thereof grounded. The base of the transistor 246 is connected to the base of the transistor 258 by junctions 278 and 260, a resistor 264, a junction 266, a resistor 268, and a junction 262. The base of the transistor 246 is connected to the collector of the transistor 258 by junctions 278 and 260, a conductor 277, parallel-connected capacitor 274 and resistor 276, and the junction 256. The base of the transistor 258 is connected to the collector of the transistor 246 by junction 262, a conductor 275, parallel-connected resistor 270 and capacitor 272, and junction 248. The transistors 246 and 258, the resistors 250, 254, 270, 276, 264 and 268, and the capacitors 272 and 274 constitute a bistable.

The base of the transistor 246 also is connected to the terminal 242 of the voltage detector by the junction 278 and by a conductor 280. The junction 252 of the bistable is connected to the terminal 138 of the D.C. auctioneering circuit by a conductor 282. The junction 266 of the bistable is connected to the terminal 140 of the D.C. auctioneering circuit by a conductor 290. The collector of the transistor 258 is connected to the second base of the unijunction transistor 124, adjacent the bottom of FIG. 1, by the junction 256 and a conductor 288. The collector of the transistor 246 is connected to the second base of the unijunction transistor 122 by the junction 248 and a conductor 287.

In the normal condition of the control system of FIG. 1, the normal A.C. power source will apply a predetermined A.C. voltage to the terminals 20 and 22; and the standby A.C. power source will apply a predetermined A.C. voltage to the terminals 24 and 26. The transformer 206 will respond to the voltage applied to the terminals 20 and 22 and will coact with the bridge rectifier 216, the Zener diode 226 and the resistors 228, 240 and 244 to establish a voltage at the terminal 242 which is positive relative to the voltage at the grounded terminal 236. The resulting difference of voltage will be applied to the base-emitter circuit of the transistor 246 of the bistable.

The voltage across the terminals 20 and 22 and the voltage across the terminals 24 and 26 will enable the transformers 182 and 184 to develop voltages at the output terminals 174 and 176, respectively, of the bridge rectifiers 166 and 168 which are positive relative to ground, and will also enable those transformers to develop voltages at the output terminals 175 and 177, respectively, of those bridge rectifiers which are negative relative to ground. Those positive and negative voltages will be applied, respectively, to the collectors and to the bases of the transistors 246 and 258 of the bistable.

The application of the positive and negative voltages, from the D.C. auctioneering circuit, to the collectors and to the bases, respectively, of the transistors 246 and 258 of the bistable will cause current to flow through the voltage divider which includes the resistors 250, 270 and 268 and to flow through the voltage divider which includes the resistors 254, 276 and 264. The voltage which is provided at the base of the transistor 246, by the flow of current through the voltage divider which includes the resistors 254, 276 and 264, will coact with the voltage that is normally applied to that base by the terminal 242 to provide a forward bias for that transistor and thereby normally render that transistor conductive; and because that transistor will normally be conductive, the voltage at the junction 248 will normally be substantially ground voltage. The voltage which is provided at the base of the transistor 258, by the flow of current through the voltage divider which includes the resistors 250, 270 and 268, will normally provide a reverse bias for that transistor and thereby normally render that transistor non-conductive.

The voltage at the second base of the unijunction transistor 122 will be the same as the voltage at the junction 248; and, because the transistor 246 will normally be conductive, both of those voltages will normally be essentially ground voltage. This means that the voltage at that second base will be positive relative to the voltage which is supplied to the first base of that unijunction transistor by the terminal 140, the conductor 285, the junction 120, and the primary winding 116. Because the transistor 258 will normally be non-conductive, a positive voltage will normally appear at the junction 256, and hence at the second base of the unijunction transistor 124; and the value of that positive voltage will be close to the value of the positive voltage at the terminal 138 of the D.C. auctioneering circuit. This means that the voltage across the base one, base two circuit of the unijunction transistor 122 will normally be less than the voltage across the base one, base two circuit of the unijunction transistor 124.

Because the voltage across the base one, base two circuit of the unijunction transistor 122 will normally be less than the voltage across the base one, base two circuit of the unijunction transistor 124, the critical value of the emitter-base one voltage of the unijunction transistor 122 also will normally be less than the critical value of the emitter-base one voltage of the unijunction transistor 124. Initially, the value of the emitter-base one voltage of the unijunction transistor 122 will be less than the critical value of that voltage; and hence, initially, the resistance of the emitter-base one circuit of the unijunction transistor 122 will be so high that current will not initially flow through the primary winding 116 of the transformer 104. Similarly, the initial value of the emitter-base one voltage of the unijunction transistor 124 will be less than the critical value of that voltage; and hence, initially, the resistance of the emitter-base one circuit of the unijunction transistor 124 will be so high that current will not initially flow through the primary winding of the transformer 106. The overall result is that the transformers 104 and 106 will not, initially, be able to supply signals to the gates of the controlled rectifiers 34 and 42 and to the gates of the controlled rectifiers 36 and 44, respectively.

After the terminals 20 and 22 are connected to the normal A.C. power source and the terminals 24 and 26 are connected to the standby A.C. power source, current will flow from the terminal 142 to ground, through the ground, through resistor 130, past junction 128, through capacitor 126, past junction 120, and through conductor 285 to the terminal 140. That flow of current will charge the capacitor and will render the upper terminal of that capacitor positive relative to the lower terminal of that capacitor, thereby rendering the emitters of the unijunction transistors 122 and 124 positive relative to the first bases of those unijunction transistors. As the voltage across the capacitor 126 rises to the critical value of the emitter-base one voltage of the unijunction transistor 122, the emitter-base one circuit of that unijunction transistor will become highly conductive and the capacitor 126 will discharge through junction 128, the emitter-base one circuit of unijunction transistor 122, primary winding 116, and junction 120. The resulting flow of current through that primary winding will cause the secondary windings 108 and 110 to apply signals to the gates of the controlled rectifiers 34 and 42 which are capable of rendering those controlled rectifiers conductive.

As the capacitor 126 discharges, the voltage across it will fall below the critical value of the emitter-base one voltage of the unijunction transistor 122; and thereupon the flow of current through the primary winding 116 will stop. That capacitor will again start to charge; and when the charge on that capacitor again rises to the critical value of the emitter-base one voltage of the unijunction transistor 122, that capacitor will again discharge and will again cause current to flow through the primary winding 116 of the transformer 104. The resulting flow of current through the secondary windings 108 and 110 will again apply signals to the gates of the controlled rectifiers 34 and 42 which are capable of rendering those controlled rectifiers conductive.

The critical value of the emitter-base one voltage of the unijunction transistor 124 will be higher than that of the unijunction transistor 122, and the recurrent discharging of the capacitor 126 will, during the normal operation of the control system of FIG. 1, keep the voltage across that capacitor from ever reaching the critical value of the emitter-base one voltage of the unijunction transistor 124. Consequently, during the normal condition of the control system of FIG. 1 the unijunction transistor 124 will not be able to permit appreciable current flow through the primary winding 118. This means that during the normal operation of the control system of FIG. 1, the transformer 106 will not apply signals to the gates of the controlled rectifiers 36 and 44; and hence those controlled rectifiers will normally disconnect the terminals 24 and 26 from the load 98.

During the normal operation of the control system of FIG. 1, capacitor 126 will recurrently charge and discharge; and hence it will enable the transformer 104 to recurrently apply signals to the gates of the controlled rectifiers 34 and 42 which are capable of rendering those controlled rectifiers conductive. The value of the capacitor 126 and of the resistor 130 will be selected so the frequency of the discharging of the capacitor 126 will be in the kilocycle range, as for example, two kilocycles per second; irrespective of whether the signal generator which includes the unijunction transistor 122, the primary winding 116, the resistor 130 and the capacitor 126 is providing signals or the signal generator which includes the unijunction transistor 124, the primary winding 118, the resistor 130 and the capacitor 126 is providing signals. Such a relatively high frequency is desirable because it assures prompt "firing" of the control rectifiers 34 and 42 whenever voltages of the proper magnitude and polarity are applied to those controlled rectifiers, and will also assure prompt "firing" of the controlled rectifiers 36 and 44 whenever those controlled rectifiers are to be turned "on."

If, during the normal condition of the control system of FIG. 1, it is assumed that the terminal 20 is positive relative to the terminal 22, current will flow from terminal 20 past junctions 210, 196 and 28, through diode 32, past junction 58, through controlled rectifier 34, past junction 48, through inductor 52, past junction 56, through the load 98, past junctions 100, 90 and 102 to conductor 27, and thence to the terminal 22. Current also will flow from terminal 20 past junctions 210, 196 and 28, through diode 32, past junction 58, through controlled rectifier 34, past junction 48, through inductor 52, past junction 56, through inductor 54, past junction 50, through controlled rectifier 42, past junctions 78 and 82, through capacitor 96, past junction 84, through diode 94 and resistor 92, past junctions 90 and 102 to conductor 27, and thence to the terminal 22; and that current flow will make the left-hand terminal of capacitor 96 positive and will charge that capacitor to the peak voltage at terminal 20. If the voltage between terminals 20 and 24 exceeds the voltage between terminals 20 and 22, current will flow from terminal 20 past junctions 210, 196 and 28, through diode 23, past junction 58, through controlled rectifier 34, past junction 48, through inductor 52, past junction 56, through inductor 54, past junction 50, through controlled rectifier 42, past junctions 78 and 82, through capacitor 96, past junctions 84 and 80, through diode 46, past junctions 30 and 204, past terminal 24, through the standby A.C. power source, past terminal 26 to conductor 27, and thence to the terminal 22; and this latter current flow will make the left-hand terminal of capacitor 96 positive and will charge that capacitor to the peak voltage between terminals 20 and 24.

During the next half cycle of the A.C. voltage supplied to the terminals 20 and 22 by the normal A.C. power source, the capacitor 96 will have no discharge path; and hence it will hold its charge. Also during that next half cycle, current will flow from terminal 22 past junctions 212, 198, 102, 90 and 100, through the load 98, past junction 56, through inductor 54, past junction 50, through controlled rectifier 42, past junction 78, through diode 40, and past junctions 28, 196 and 210 to the terminal 20. Current also will flow from terminal 22 past junctions 212, 198, 102, 90, 100 and 72, through resistor 74 and diode 76, past junction 64, through capacitor 66, past junctions 62 and 58, through controlled rectifier 34, past junction 48, through inductor 52, past junction 56, through inductor 54, past junction 50, through controlled rectifier 42, past junction 78, through diode 40, and past junctions 28, 196 and 210 to the terminal 20; and that current flow will make the right-hand terminal of capacitor 66 positive and will charge that capacitor to the peak voltage at terminal 22. If the voltage between terminals 20 and 24 extends the voltage between terminals 20 and 22, current will flow from terminal 22 past junctions 212, 198, 102 and 202, past terminal 26, through the standby power source, past terminal 24, past junctions 204 and 30, through diode 38, past junctions 60 and 64, through capacitor 66, past junctions 62 and 58, through controlled rectifier 34, past junction 48, through inductor 52, past junction 56, through inductor 54, past junction 50, through controlled rectifier 42, past junction 78, through diode 40, and past junctions 28, 196 and 210 to terminal 20; and that current flow will make the right-hand terminal of capacitor 66 positive and will charge that capacitor to the peak voltage between terminals 20 and 22.

During the third half cycle, the terminal 20 will again be positive relative to the terminal 22; and the capacitor 66 will not have a discharge path. As a result, that capacitor will hold its charge.

During that third half cycle, and during all subsequent, normal, odd-numbered half cycles, of the normal A.C. power source, current will flow in one direction through the load 98; and during the fourth half cycle, and during all subsequent normal, even-numbered half cycles, of the normal A.C. power source, current will flow in the opposite direction through that load. During that third half cycle, and during all subsequent, normal, odd-numbered half cycles, of the normal A.C. power source, any loss of charge from the capacitor 96, due to leakage, will be replaced; and during that fourth half cycle, and during all subsequent, normal, even-numbered half cycles, of the normal A.C. power source, any loss of charge from capacitor 66, due to leakage, will be replaced. This means that during the normal condition of the control system of FIG. 1, the load 98 will be supplied with A.C. voltage of the required value, and the capacitors 66 and 96 will be kept charged.

If the voltage of the normal A.C. power source ever falls below the lower of its intended limits, the voltage at the junction 242 of the voltage detector will decrease until it is negative relative to ground; and, thereupon, the base of the transistor 246 will be rendered negative relative to the emitter of that transistor. At such time, that transistor will become non-conductive; and the resulting decrease in the collector current of that transistor will cause the voltage at the collector of that transistor to increase. The capacitor 272 will couple that increase in voltage to the base of the transistor 258, thereby reducing the reverse bias of that transistor. The conductivity of the transistor 258 will then increase; and the voltage at the collector of that transistor will then begin to approach ground voltage at the terminal 142. The capacitor 274 will couple this change in voltage to the base of the transistor 246, thereby making that base more negative and thereby decreasing the conducitivty of that transistor. Very promptly, the transistor 258 will become fully conductive and the transistor 246 will become non-conductive.

As the transistor 246 become non-conductive, the output resistance thereof will increase; and the voltage at the junction 248, and thus at the second base of the unijunction transistor 122 will closely approach the value of the positive voltage at the terminal 138. As the transistor 258 becomes conductive, the output resistance thereof will decrease; and the voltage at the junction 256, and thus at the second base of the unijunction transistor 124, will closely approach ground voltage. As a result, the voltage across the base one, base two circuit of the unijunction transistor 124 will be less than the voltage across the base one, base two circuit of the unijunction transistor 122.

The critical value of the emitter-base one voltage of the unijunction transistor 124 will be less than the critical value of the emitter-base one voltage of the unijunction transistor 122. As current flows from terminal 142 to ground, through the ground, through resistor 130, past junction 128, through capacitor 126, past junction 120, and through the conductor 285 to the terminal 140, the voltage across that capacitor will approach the critical value of the emitter-base one voltage of the unijunction transistor 124; and as the voltage across that capacitor rises to the critical value of the emitter-base one voltage of the unijunction transistor 124, the emitter-base one circuit of that unijunction transistor will become highly conductive. The capacitor 126 will discharge through the emitter-base one circuit of the unijunction transistor 124 and the primary winding 118; and the resulting flow of current through that primary winding will cause the secondary windings 112 and 114 to apply signals to the gates of the controlled rectifiers 36 and 44 which are capable of rendering those controlled rectifiers conductive.

As the capacitor 126 discharges, the voltage across it will fall below the critical value of the emitter-base one circuit of the unijunction transistor 124; and thereupon the flow of current through the primary winding 118 will stop. The capacitor 126 will then again start to charge; and when the charge on that capacitor again rises to the critical value of the emitter-base one voltage of the unijunction transistor 124, that capacitor will again discharge and will again cause current to flow through the primary winding 118 of transformer 106. The resulting flow of current through the secondary windings 112 and 114 will again apply signals to the gates of the controlled rectifiers 36 and 44 which are capable of rendering those controlled rectifiers conductive.

The transistor 246 will shift from its normally conductive state to its non-conductive state, and the transistor 258 will shift from its normally non-conductive state to its conductive state, in a matter of micro-seconds; and hence the transformer 104 will promptly stop supplying signals to the gates of the controlled rectifiers 34 and 42, and the transformer 106 will promptly start supplying signals to the gates of the controlled rectifiers 36 and 44. As the signals from the transformer 106 render the controlled rectifiers 36 and 44 conductive, the capacitors 66 and 96 will apply reverse voltages to the controlled rectifiers 34 and 42 and thereby render those controlled rectifiers non-conductive. Also, as the signals from the transformer 106 render the controlled rectifiers 36 and 44 conductive, the standby A.C. power source will supply power to the load 98 and will charge the capacitors 66 and 96 in the opposite direction.

For example, if it were assumed that the terminal 24 was positive as the transformer 106 began supplying signals to the gates of the controlled rectifiers 36 and 44, current would flow from the terminal 24 past junctions 204 and 30, through the diode 38, past junction 60, through the controlled rectifier 36, past junction 48, through inductor 52, past junction 56, through load 98, past junctions 100, 90 and 102 to conductor 27, and thence to terminal 26. Current would also flow from terminal 24 past junctions 204 and 30, through diode 38, past junction 60, through controlled rectifier 36, past junction 48, through inductor 52, past junction 56, through inductor 54, past junction 50, through controlled rectifier 44, past junctions 80 and 84, through capacitor 96, past junction 82, through diode 86 and resistor 88, past junctions 90 and 102 to conductor 27, and thence to terminal 26; and that flow of current would make the left-hand terminal of that capacitor negative and would charge that capacitor to the peak voltage of the terminal 24. If the voltage between the terminals 24 and 20 is larger than the voltage between the terminals 24 and 26, current would flow from terminal 24, past junctions 204 and 30, through diode 38, past junction 60, through controlled rectifier 36, past junction 48, through inductor 52, past junction 56, through inductor 54, past junction 50, through controlled rectifier 44, past junctions 80 and 84, through capacitor 96, past junction 82, past junction 78, through diode 40, past junctions 28, 196 and 210 to terminal 20, through the normal A.C. power source, past terminal 22 to conductor 27, and thence to terminal 26; and such current flow would make the left-hand terminal of that capacitor negative and would charge that capacitor to the peak voltage of the terminal 24.

During the next half cycle of the A.C. voltage supplied to the terminals 24 and 26 by the standby A.C. power source, the capacitor 96 would have no discharge path; and hence it would hold its charge. Also during that next half cycle, current would flow from terminal 26 past junctions 202, 102, 90 and 100, through the load 98, past junction 56, through inductor 54, past junction 50, through controlled rectifier 44, past junction 80, through diode 46, and past junctions 30 and 204 to the terminal 24. Current also would flow from terminal 26 past junctions 202, 102, 90, 100 and 72, through resistor 70 and diode 68, past junction 62, through capacitor 66, past junctions 64 and 60, through controlled rectifier 36, past junction 48, through inductor 52, past junction 56, through inductor 54, past junction 50, through controlled rectifier 44, past junction 80, through diode 46, and then through junctions 30 and 204 to terminal 24; and that current flow would make the left-hand terminal of capacitor 66 positive and would charge that capacitor to the peak voltage at the terminal 26. If the voltage between the terminals 24 and 20 is larger than the voltage between the terminals 24 and 26, current would flow from terminal 26 past junctions 202, 102, 198 and 212 to the terminal 22, through the normal A.C. power source to the terminal 20, past junctions 210, 196 and 28, through diode 32, past junctions 58 and 62, through capacitor 66, past junctions 64 and 60, through controlled rectifier 36, past junction 48, through inductor 52, past junction 56, through inductor 54, past junction 50, through controlled rectifier 44, past junction 80, through diode 46, and then through junctions 30 and 204 to terminal 24; and such current flow would make the left-hand terminal of capacitor 66 positive and would charge that capacitor to the peak voltage at the terminal 26.

During the third half cycle of the standby A.C. power source, the terminal 24 would again be positive relative to the terminal 26; and the capacitor 66 would not have a discharge path. As a result, that capacitor would hold its charge.

During that third half cycle, and during all subsequent, odd-numbered half cycles, of the standby A.C. power source, current would flow in the said one direction through the load 98; and during the fourth half cycle, and during all subsequent even-numbered half cycles, of the standby A.C. power source, current would flow in the said opposite direction through that load. During that third half cycle, and during all subsequent, odd-numbered half cycles, of the standby A.C. power source, any loss of charge from the capacitor 96, due to leakage, would be replaced; and during that fourth half cycle, and during all subsequent even-numbered half cycles, of the standby A.C. power source, any loss of charge from the capacitor 66, due to leakage, would be replaced. This means that whenever the voltage of the normal A.C. power source falls below the lower of its intended limits, the load 98 will be supplied with A.C. voltage of the required value by the standby A.C. power source, and the capacitors 66 and 96 will be kept charged by that standby A.C. power source.

During the few microseconds required to render the controlled rectifiers 34 and 42 non-conductive, the inductors 52 and 54 will limit any cross currents between the normal A.C. power source and the standby A.C. power source. That limitation of cross currents is effective and is very desirable.

It will be noted that the controlled rectifiers 36 and 44 connected the standby A.C. power source to the load 98 prior to the time the controlled rectifiers 34 and 42 were rendered non-conductive. This is desirable because it means that the flow of current through the load 98 need not be interrupted during the transference of that load from the normal A.C. power source to the standby A.C. power source.

Until the controlled rectifiers 36 and 44 are rendered conductive, the voltage across the load 98 will correspond to the voltage of the normal A.C. power source. After the controlled rectifiers 36 and 44 are rendered conductive, the voltage across the load 98 will correspond to the voltage of the standby A.C. power source.

The standby A.C. power source can continue to supply power to the load 98 as long as the voltage of the normal A.C. power source is below the lower of its intended limits. However, when the voltage of the normal A.C. power source rises above the lower of its intended limits, the voltage at the terminal 242 of the voltage detector will again become positive relative to the voltage at the grounded terminal 236 of that voltage detector. Thereupon, the voltage at the base of the transistor 246 of the bistable will become positive and will render that transistor conductive. The resulting increase in the collector current of that transistor will cause the voltage at the collector of that transistor to decrease. The capacitor 272 will couple that decrease in voltage to the base of the transistor 258, thereby decreasing the forward bias of that transistor. The conductivity of transistor 258 will then decrease; and the voltage of the collector of that transistor will then begin to approach the voltage at the termiinal 138 of the D.C. auctioneering circuit. The capacitor 274 will couple this change in voltage to the base of the transistor 246, thereby making that base more positive and thereby increasing the conductivity of that transistor. Very promptly, the transistor 246 will become fully conductive and the transistor 258 will become non-conductive.

As the transistor 246 becomes conductive, the output resistance thereof will decrease; and the voltage at the junction 248, and thus at the second base of the unijunction transistor 122, will closely approach ground voltage. As a result the critical value of the emitter-base one circuit of the unijunction transistor 122 will decrease.

As the transistor 258 becomes non-conductive, the output resistance thereof will increase; and the voltage at the junction 256, and thus at the second base of the unijunction transistor 124, will approach the voltage at the terminal 138. As a result, the critical value of the emitter-base one voltage of the unijunction transistor 124 will rise above the critical value of the emitter-base one voltage of the unijunction transistor 122.

The overall result of the rendering of the transistor 246 conductive and of the rendering of the transistor 258 non-conductive is that the transformer 106 will stop supplying signals to the gates of the controlled rectifiers 36 and 44 and the transformer 104 will again start supplying signals to the gates of the controlled rectifiers 34 and 42. As the latter signals render the controlled rectifiers 34 and 42 conductive, the capacitors 66 and 96 will apply reverse voltages to the controlled rectifiers 36 and 44 and thereby render those controlled rectifiers non-conductive. As the controlled rectifiers 34 and 42 become conductive, the normal A.C. power source will once again supply power to the load 98 and will once again charge the capacitors 66 and 96. Thereafter, that normal A.C. power source will continue to supply power to the load 98 and will continue to keep the capacitors 66 and 96 charged until the load 98 is to be disconnected from both the normal A.C. power source and the standby A.C. power source, or the voltage of the normal A.C. power source again falls below the lower of its intended limits.

It will be noted that while the normal A.C. power source is supplying power to the load 98, some current can flow from the normal A.C. power source through the capacitors 66 and 96 to the standby A.C. power source. However, only enough current can flow to assure charging of those capacitors, and those capacitors will keep either of those A.C. power sources from "short circuiting" the other.

The control system of FIG. 1 is able to transfer the load from the normal A.C. power source to the standby A.C. power source and is then subsequently able to transfer that load back to the normal A.C. power source. In some instances, it is not necessary to transfer the load back from the standby A.C. power source to the normal A.C. power source; and in such instances it is possible to reduce the cost of the control system of FIG. 1 by eliminating some of the components of that control system. FIG. 2 discloses a transfer unit which can be substituted for the transfer unit of the control system of FIG. 1; and the transfer unit of FIG. 2 has fewer components than does the transfer unit of FIG. 1. To effect the substitution of the transfer unit of FIG. 2 for the transfer unit of FIG. 1, it is only necessary to separate the junctions 28, 30 and 90 of the latter transfer unit, respectively, from the junctions 196, 204 and 102, and to connect the junctions 328, 330 and 395, respectively, of the transfer unit of FIG. 2 to the junctions 196, 204 and 102 of FIG. 1. However, it will usually be desirable to provide a relay or some other device which will, after the load has been transferred to the standby A.C. power source, disconnect the terminal 20 or 22 from the normal A.C. power source and thereby keep that load from being transferred back to that normal A.C. power source.

The controlled rectifiers 334, 336, 342 and 344 correspond to the controlled rectifiers 34, 36, 42 and 44 of FIG. 1. The inductors 352 and 354 correspond to the inductors 52 and 54 of FIG. 1; and the load 398 corresponds to the load 98 of FIG. 1. The capacitors 366 and 396 correspond to the capacitors 66 and 96 of FIG. 1; and the junctions 358, 348, 360, 356, 378, 350 and 380 correspond to the junction 58, 48, 60, 56, 78, 50 and 80 of FIG. 1. The diodes 389 and 391 correspond to the diodes 76 and 94 of FIG. 1, and the resistors 385 and 387 correspond to the resistors 74 and 92 of FIG. 1. Essentially the transfer units of FIG. 2 is the same as the transfer unit of FIG. 1 except for the elimination of the diodes 32 and 40, of the diodes 68 and 86, and of the resistors 70 and 88.

In the normal condition of the control system of FIG. 1, as modified by the substitution of the transfer unit of FIG. 2 for the transfer unit of FIG. 1, the secondary winding 108 of the transformers 104 will apply signals to the gate of the controlled rectifier 334 and the secondary winding 110 of that transformer will apply signals to the gate of the controlled rectifier 342. If the terminal 20 is positive relative to the terminal 22, current will flow from terminal 20 past junctions 210, 196, 328 and 358, through controlled rectifier 334, past junction 348, through inductor 352, past junction 356, through the load 398, past junctions 395 and 102 to conductor 27, and thence to the terminal 22. Current will also flow from terminal 20 past junctions 210, 196, 328 and 378, through capacitor 396, past junction 383, through resistor 387 and diode 391, past junctions 393, 395 and 102 to conductor 27, and thence to the terminal 22; and that current flow will make the left-hand terminal of that capacitor positive and will charge that capacitor to the peak voltage of the terminal 20. If the voltage between the terminals 20 and 24 is larger than the voltage between the terminals 20 and 22, current will flow from terminal 20 past junctions 210, 196, 328 and 378, through capacitor 396, past junctions 383 and 380, through diode 346, past junctions 330 and 204 to terminal 24, through the standby A.C. power source to the terminal 26, and then through conductor 27 to the terminal 22; and this latter flow of current will make the left-hand terminal of the capacitor 396 positive and will charge that capacitor to the peak voltage of the terminal 20.

During the next half cycle of the A.C. voltage supplied to the terminals 20 and 22 by the normal A.C. power source, the capacitor 396 will not have a discharge path; and hence it will hold its charge. Also during that next half cycle, current will flow from the terminal 22 past junctions 212, 198, 102 and 395, through the load 398, past junction 356, through the inductor 354, past junction 350, through the controlled rectifier 342, and past junctions 378, 328, 196 and 210 to the terminal 20. Current also will flow from terminal 22 past junctions 212, 198, 102, 395 and 393, through diode 389 and resistor 385, past junction 381, through capacitor 366, and past junctions 358, 328, 196 and 210 to the terminal 20; and that current flow will make the right-hand termnial of the capacitor 366 positive and will charge that capacitor to the peak voltage of the terminal 22. If the voltage between the terminals 20 and 24 is larger than the voltage between the terminals 20 and 22, current will flow from terminal 22 past junctions 212, 198, 102 and 202 to the terminal 26, through the standby A.C. power source, past terminal 24, past junctions 204 and 330, through diode 338, past junctions 360 and 381, through capacitor 366, and past junctions 358, 328, 196 and 210 to the terminal 20; and that current flow will make the right-hand terminal of the capacitor 366 positive and will charge that capacitor to the peak voltage of the terminal 22.

During the third half cycle, the terminal 20 will again be positive relative to the terminal 22; and the capacitor 366 will not have a discharge path. As a result, that capacitor will hold its charge.

During that third half cycle, and during all subsequent, normal, odd-numbered half cycles, of the normal A.C. power source, current will flow in one direction through the load 398; and during the fourth half cycle, and during all subsequent, normal, even-numbered half cycles, of the normal A.C. power source, current will flow in the opposite direction through that load. During that third half cycle, and during all subsequent, normal, odd-numbered half cycles, of the normal A.C. power source, any loss of charge from the capacitor 396, due to leakage, will be replaced; and during that fourth half cycle, and during all subsequent, normal, even-numbered half cycles, of the normal A.C. power source, any loss of charge from the capacitor 366, due to leakage, will be replaced. This means that during the normal operation of the control system of FIG. 1, as it is modified by the substitution of the transfer unit of FIG. 2 for the transfer unit of FIG. 1, the load 398 will be supplied with A.C. voltage of the required value, and the capacitors 366 and 396 will be kept charged.

If the voltage of the normal A.C. power source should fall below the lower of its intended limits, the voltage at the junction 242 of the voltage detector would decrease and would act through the bistable and the signal generators to halt the supplying of signals to the gates of the controlled rectifiers 334 and 342 and to begin the supplying of signals to the gates of the controlled rectifiers 336 and 344. As the signals from the transformer 106 render the controlled rectifiers 336 and 344 conductive, the capacitors 366 and 396 will apply reverse voltages to the controlled rectifiers 334 and 342 and thereby render those latter controlled rectifiers non-conductive. Also as the signals from the transformer 106 render the controlled rectifiers 336 and 344 conductive, the standby A.C. power source will supply power to the load 398.

For example, if the terminal 24 is positive as the transformer 106 begins supplying signals to the gates of the controlled rectifiers 336 and 344, current will flow from terminal 24 past junctions 204 and 330, through diode 338, past junction 360, through controlled rectifier 336, past junction 348, through inductor 352, past junction 356, through the load 398, past junctions 395 and 102 to the conductor 27, and thence to the terminal 26. During the next half cycle of the A.C. voltage supplied to the terminals 24 and 26 by the standby A.C. power source, current will flow from the terminal 26 past the junctions 202, 102 and 395, through the load 398, past the junction 356, through the inductor 354, past the junction 350, through the controlled rectifier 344, past the junction 380, through the diode 346, and past the junctions 330 and 204 to the terminal 24. In this way, the standby A.C. power source will be able to supply power to the load 398.

Current will also be able, during the alternate half cycles of the A.C. voltage supplied to the terminals 24 and 26 by the standby A.C. power source, to flow through the capacitors 366 and 396. However any charging of those capacitors due to that current flow will not be significant because the transfer unit of FIG. 2 is not intended to effect a re-transfer of the load 398 back to the normal A.C. power source.

FIG. 3 shows another form of transfer unit which can be substituted for the transfer unit of FIG. 1; and to substitute the transfer unit of FIG. 3 for the transfer unit of FIG. 1, it is only necessary to disconnect the junctions 28, 30 and 90, respectively, from the junctions 196, 204 and 102 and to connect the junctions 428 and 430, respectively, to the junctions 196 and 204 in FIG. 1 and to connect the right-hand terminal of the load 498 to the junction 102 in FIG. 1. As indicated in connection with the transfer unit of FIG. 2, it will usually be desirable to provide a relay or some other device which will, after the load has been transferred to the standby A.C. power source, disconnect the terminal 20 or 22 from the normal A.C. power source and thereby keep that load from being transferred back to that normal A.C. power source.

The transfer unit of FIG. 3 is similar to the transfer unit of FIG. 2 in the sense that it will only transfer the load from the normal A.C. power source to the standby A.C. power source and will not transfer that load back to the normal A.C. power source. However, the transfer unit of FIG. 3 differs from the transfer unit of FIG. 2 in utilizing a different arrangement for charging the capacitors. Specifically, the transfer unit of FIG. 2 utilizes the diodes 389 and 391 and the resistors 385 and 387 in the charging of the capacitors 366 and 396, whereas the transfer unit of FIG. 3 utilizes voltage sources 471 and 473 and resitors 475 and 477 to charge the capacitors 466 and 496. A number of different voltage sources 471 and 473 could be used, because the principal requirements of those voltage sources are merely that they be D.C. voltage sources and that they sufficiently charge the capacitors 466 and 496 prior to the time the load is to be transferred from the normal A.C. power source to the standby A.C. power source to enable those capacitors to "blow out" the controlled rectifiers 434 and 442 during that transfer.

If, during the normal condition of the control system of FIG. 1, as it is modified by the substitution of the transfer unit of FIG. 3 for the transfer unit of FIG. 1, it is assumed that the terminal 20 is positive relative to the terminal 22, current will flow from terminal 20 past junctions 210, 196, 428 and 458, through controlled rectifier 434, past junction 448, through inductor 452, past junction 456, through the load 498, and past junction 102 to the conductor 27, and thence to the terminal 22. During the next half cycle of the A.C. voltage supplied to the terminals 20 and 22 by the normal A.C. power source, current will flow from terminal 22 past junction 212, 198 and 102, through the load 498, past junction 456, through the inductor 454, past junctions 450, through the controlled rectifier 442, and past junctions 478, 428, 196 and 210 to the terminal 20. In this way, the normal A.C. power source will supply power to the load 498. While that A.C. power source is supplying power to the load 498, the voltage source 471 will be making the right-hand terminal of the capacitor 466 positive and will be charging that capacitor to the voltage of that voltage source, and the voltage source 473 will be making the left-hand terminal of the capacitor 496 positive and will be charging that capacitor to the voltage of that voltage source.

If the voltage of that normal A.C. power source falls below the lower of its intended limits, the voltage at the junction 242 of the voltage detector will decrease and will act through the bistable and the signal generators to halt the supplying of signals to the gates of the controlled rectifiers 434 and 442 and to begin the supplying of signals to the gates of the controlled rectifiers 436 and 444. As the controlled rectifier 436 becomes conductive, the charge which was impressed upon the capacitor 466 by the voltage source 471 will apply an inverse voltage to the controlled rectifier 434 and thereby render that controlled rectifier non-conductive. As the controlled rectifier 444 becomes conductive, the charge which was impressed upon the capacitor 496 by the voltage source 473 will apply an inverse voltage to the controlled rectifier 442 and thereby render that controlled rectifier non-conductive.

Subsequently, the standby A.C. power source will supply power to the load 498. Specifically, if the terminal 24 is positive at the time the controlled rectifiers 436 and 444 became conductive, current will flow from the terminal 24 past the junctions 204 and 430, through the diode 438, past the junction 460, through the controlled rectifier 436, past the junction 448, through the inductor 452, past the junction 456, through the load 498 to the junction 102, and then through the conductor 27 to the terminal 26. During the next half cycle of the A.C. voltage supplied to the terminals 24 and 26 by the standby A.C. power source, current will flow from the terminal 26 past the junctions 202 and 102, through the load 498, past the junction 456, through the inductor 454, past the junction 450, through the controlled rectifier 444, past the junction 480, through the diode 406, and past the junctions 430 and 204 to the terminal 24. In this way, the standby A.C. power source will be able to supply power to the load 498.

The control system of FIG. 1, and the control system of FIG. 1 as modified by the substitution of the transfer units of FIGS. 2 and 3 for the transfer unit of FIG. 1, always directly connect the terminal 22 to the terminal 26. In some instances, it may be desirable to isolate both terminals of the normal A.C. power source from the terminals of the standby A.C. power source until after the load has been transferred from that normal A.C. power source to that standby A.C. power source. FIG. 4 shows a control system which can isolate both terminals of the normal A.C. power source from the terminals of the standby A.C. power source until after the load has been transferred from that normal A.C. power source to that standby A.C. power source; and that control system utilizes the voltage detector and the bistable and the D.C. auctioneering circuit of the control system of FIG. 1, and the components of that voltage detector, of that bistable, and of that D.C. auctioneering circuit are denoted by the same numerals which are used in FIG. 1.

Instead of having the lower terminal of the normal A.C. power source connected directly to the lower terminal of the standby A.C. power source, as shown by FIG. 1, the control system of FIG. 4 interposes two controlled rectifiers between those terminals. Specifically, controlled rectifiers 565 and 585 are interposed between the lower terminal 522 of the normal A.C. power source and the lower terminal 525 of the standby A.C. power source. The controlled rectifier 565 has the anode thereof connected to the cathodes of two diodes 555 and 559 by a junction 563, and it has the cathode thereof connected to the anodes of two diodes 553 and 557 by a junction 561. The cathode of the diode 553 is connected to the upper terminal of a center-tapped inductor 549, and the lower terminal of that inductor is connected to the anode of the diode 555. The center-tap of that inductor is connected to the terminal 522 by junctions 198, 607 and 212. The cathode of the diode 557 is connected to the upper terminal of a center-tapped inductor 551, and the lower terminal of that inductor is connected to the anode of the diode 559. The inductors 549 and 551 are wound on the same core. The anode of the controlled rectifier 585 is connected to the cathodes of diodes 577 and 579 by a junction 583, and the cathode of that controlled rectifier is connected to the anodes of diodes 573 and 575 by a junction 581. The cathode of the diode 573 is connected to the upper terminal of a center-tapped inductor 569, and the lower terminal of that inductor is connected to the anode of the diode 577. The cathode of the diode 575 is connected to the upper terminal of a center-tapped inductor 571, and the lower terminal of that inductor is connected to the anode of the diode 579. The center tap of the inductor 571 is connected to the terminal 526 by junctions 593 and 202. The center taps of the inductors 551 and 569 are connected to the load 598 by the junction 102. The inductors 569 and 571 are wound upon the same core.

Controlled rectifiers 517 and 547 are connected intermediate the upper terminal 520 of the normal A.C. power source and the upper terminal 524 of the standby A.C. power source. The anode of the controlled rectifier 517 is connected to the cathodes of diodes 509 and 511 by a junction 515, and the cathode of that controlled rectifier is connected to the anodes of diodes 505 and 507 by a junction 513. The cathode of the diode 505 is connected to the upper terminal of a center-tapped inductor 501, and the lower terminal of that inductor is connected to the anode of the diode 509. The cathode of the diode 507 is connected to the upper terminal of a center-tapped inductor 503, and the lower terminal of that inductor is connected to the anode of the diode 511. The center tap of the inductor 501 is connected to the terminal 520 by the junctions 196 and 210. The inductors 501 and 503 are wound upon the same core.

The anode of the controlled rectifier 547 is connected to the cathodes of diodes 539 and 541 by a junction 545. The cathode of that controlled rectifier is connected to the anodes of diodes 535 and 537 by a junction 543. The cathode of the diode 535 is connected to the upper terminal of a center-tapped inductor 531, and the lower terminal of that inductor is connected to the anode of the diode 539. The cathode of the diode 537 is connected to the upper terminal of a center-tapped inductor 533, and the lower terminal of that inductor is connected to the anode of the diode 541. The inductors 531 and 533 are wound upon the same core. The center tap of the inductor 533 is connected to the terminal 524 by a junction 204; and the center taps of the inductors 503 and 531 are connected to the load 598 by a junction 611.

A capacitor 566 is connected to the junctions 513 and 543, and a capacitor 596 is connected to the junctions 515 and 545. A diode 605 and a resistor 603 are connected to junctions 607 and 601; and a diode 591 and a resistor 589 are connected to junctions 593 and 587.

The bistable of FIG. 44 does not actuate a signal generator of the type shown in FIG. 1; but, instead, acts through a transformer 619 to supply signals to the gates of the controlled rectifiers 517, 547, 565 and 585. Specifically, a resistor 615 connects the junction 266 of the bistable to one terminal of the primary winding 617 of a transformer 619, and the other terminal of that primary winding is connected to the junction 248 of that bistable. The transformer 619 has secondary windings 621 and 625 which can supply signals to the controlled rectifiers 517 and 565, and that transformer has secondary windings 629 and 633 which can supply signals to the controlled rectifiers 547 and 585. Diodes 623 and 627, respectively, are connected to the secondary windings 621 and 625 and will enable those secondary windings to provide D.C. voltages of the required polarity to the gates of the controlled rectifiers 517 and 565. Diodes 631 and 635 are connected to the secondary windings 629 and 633 and will enable those windings to provide D.C. voltages of the required polarity to the gates of the controlled rectifiers 547 and 585.

At the time the control system of FIG. 4 has the terminals 520 and 522 thereof connected to the normal A.C. power source and has the terminals 524 and 526 thereof connected to the standby A.C. power source, the voltage detector of that control system will respond to the voltage of the normal A.C. power source to make the voltage at the junction 242 positive relative to the voltage at the grounded terminal 236. As a result, the transistor 246 will be rendered conductive; and the consequent current flow through the voltage divider which includes the resistors 250, 270 and 268 will provide a voltage at the base of the transistor 258 that will render that transistor non-conductive. As the transistor 246 becomes conductive and the transistor 258 becomes non-conductive a change will occur, in the electron current that flows from junction 140 through conductor 643, past junction 645, through resistor 615, through primary winding 617, past junction 248, through resistor 250, and past junction 252 to the terminal 138; and that change will enable the secondary windings 621 and 625 to apply a short "firing" pulse to the gates of the controlled rectifiers 517 and 565.

If the terminal 520 is positive at the time the "firing" pulses are applied to the gates of the controlled rectifiers 517 and 565, current will flow from terminal 520 past junctions 210 and 196, through the lower section of inductor 501, through diode 509, past junction 515, through controlled rectifier 517, past junction 513, through diode 507, through the upper section of the inductor 503, past junction 611, through the load 598, past junction 102, through the lower section of the inductor 551, through the diode 559, past junction 563, through the controlled rectifier 565, past junction 561, through the diode 553, through the upper section of the inductor 549, and past junctions 198, 607 and 212 to the terminal 522. Current also will flow from terminal 520 past junctions 210 and 196, through the lower section of inductor 501, through diode 509, past junction 515, through controlled rectifier 517, past junctions 513 and 587, through capacitor 566, past junction 601, through resistor 603 and diode 605, and past junctions 607 and 212 to the terminal 522; and that current flow will make the left-hand terminal of the capacitor 566 positive and will charge that capacitor to the peak value of the voltage at the terminal 520. If the terminal 524 is positive relative to the terminal 526, current also will flow from the terminal 524 past junction 204, through the lower section of the inductor 533, through the diode 541, past junction 545, through the capacitor 596, past junction 515, through the controlled rectifier 517, past the junctions 513 and 587, through resistor 589 and diode 591, and past junctions 593 and 202 to the terminal 526; and that flow of current will make the right-hand terminal of the capacitor 596 positive and will charge that capacitor to the peak voltage of the terminal 524.

During the next half cycle of the A.C. voltage that is supplied to the terminals 520 and 522 by the normal A.C. power source, current will flow from the terminal 522 past junctions 212, 607 and 198, through the lower section of inductor 549, through diode 555, past junction 563, through controlled rectifier 565, past junction 561, through diode 557, through the upper section of inductor 551, past junction 102, through the load 598, past junction 611, through the lower section of inductor 503, through diode 511, past junction 515, through controlled rectifier 517, past junction 513, through diode 505, through the upper section of inductor 501, and past junctions 196 and 210 to the terminal 520.

It will be noted that the controlled rectifiers 517 and 565 are in the D.C. legs of full wave bridge rectifiers; and hence each of those controlled rectifiers will conduct during each half cycle of the A.C. voltage that is supplied by the normal A.C. power source. At the end of each half cycle, the current through the controlled rectifiers 517 and 565 will tend to drop to values below the holding currents of those controlled rectifiers, and thereby turn those controlled rectifiers "off." However, the energy stored within the inductors 501, 503, 549 and 551 during each half cycle will keep current flowing in the "forward" direction through those controlled rectifiers as the waveform of the A.C. voltage supplied by the normal A.C. power source passes through zero; and that current will keep those controlled rectifiers in the conductive state even though no further signals are supplied to the gates of those controlled rectifiers. Specifically, the energy within the inductors 501 and 503 will cause current to flow through controlled rectifier 517, past junction 513, through diode 505, through both sections of inductor 501, and past junction 515 and will also cause current to flow through controlled rectifier 517, past junction 513, through diode 507, through both sections of inductor 503, through diode 511, and past junction 515. Similarly, the energy within the inductors 549 and 551 will cause current to flow through the controlled rectifier 565, past junction 561, through diode 553, through both sections of inductor 549, through diode 555 and past junction 563 and will also cause current to flow through the controlled rectifier 565, past junction 561, through diode 557, through both sections of inductor 551, through diode 559 and past junction 563.

The normal A.C. power source will continue to supply power to the load 598 until the voltage of that power source falls below the lower of its intended limits and thereby makes the voltage at the terminal 242 of the voltage detector negative relative to the voltage at the grounded terminal 236. At such time, the transistor 258 will be rendered conductive and the transistor 246 will be rendered non-conductive; and the resulting change in the electron current that flows from junction 140 through conductor 643, past junction 645, through resistor 615, through primary winding 617, past junction 248, through resistor 250, and past junction 252 to the terminal 138 will enable the secondary windings 629 and 633 to supply "firing" pulses to the gates of the controlled rectifiers 547 and 585. As the controlled rectifier 547 becomes conductive, the capacitors 566 and 596 will coact to apply a large inverse voltage to the controlled rectifier 517, and will thereby promptly render that controlled rectifier non-conductive.

If the controlled rectifiers 547 and 585 become conductive when the terminal 524 is positive relative to the terminal 526, current will flow from terminal 524 past junction 204, through the lower section of inductor 533, through diode 541, past junction 545, through controlled rectifier 547, past junction 543, through diode 535, through the upper section of inductor 531, past junction 611 through the load 598, past junction 102, through the lower section of inductor 569, through diode 577, past junction 583, through controlled rectifier 585, past junction 581, through diode 575, through the upper section of inductor 571, and past junctions 593 and 202 to terminal 526. Current will also flow from terminal 524 past junction 204, through the lower section of inductor 533, through diode 541, past junction 545, through controlled rectifier 547, past junctions 543 and 601, through capacitor 566, past junction 587, through resistor 589 and diode 591, and past junctions 593 and 202 to terminal 526; and that current flow will make the right-hand terminal of capacitor 566 positive and will charge that capacitor to the peak value of the terminal 524. If a voltage appears at the terminal 520, and if that voltage is positive relative to the voltage at the terminal 522, current will flow from terminal 520 past junctions 210 and 196, through the lower section of inductor 501, through diode 509, past junction 515, through capacitor 596, past junction 545, through controlled rectifier 547, past junctions 543 and 601, through resistor 603 and diode 605, and past junctions 607 and 212 to terminal 522; and that current flow will make the left-hand terminal of capacitor 596 positive and will charge that capacitor to the peak value of the terminal 520.

During the next half cycle of the A.C. voltage that is supplied to the terminals 524 and 526 by the standby A.C. power source, current will flow from the terminal 526, past junctions 202 and 593, through the lower section of inductor 571, through diode 579, past junction 583, through controlled rectifier 585, past junction 581, through diode 573, through the upper section of inductor 569, past junction 102, through load 598, past junction 611, through the lower section of inductor 531, through diode 539, past junction 545, through controlled rectifier 547, past junction 543, through diode 537, through the upper section of inductor 533, and past junction 204 to terminal 524.

It will be noted that the controlled rectifiers 547 and 585 are in the D.C. legs of full wave bridge rectifiers; and hence each of those controlled rectifiers will conduct during each half cycle of the A.C. voltage that is supplied by the standby A.C. power source. At the end of each half cycle, the current through the controlled rectifiers 547 and 585 will tend to drop to values below the holding currents of those controlled rectifiers, and thereby turn those controlled rectifiers "off." However, the energy stored within the inductors 531, 533, 569 and 571 during each half cycle will keep current flowing in the "forward" direction through those controlled rectifiers as the waveform of the A.C. voltage supplied by the standby A.C. power source passes through zero; and that current will keep those controlled rectifiers in the conductive state even though no further signals are supplied to the gates of those controlled rectifiers. Specifically, the energy within the inductors 531 and 533 will cause current to flow through controlled rectifier 547, past junction 543, through diode 535, through both sections of inductor 531, through diode 539 and past junction 545 and will also cause current to flow through controlled rectifier 547, past junction 543, through diode 537, through both sections of inductor 533, through diode 541, and past junction 545. Similarly, the energy within the inductors 569 and 571 will cause current to flow through controlled rectifier 585, past junction 581, through diode 573, through both sections of inductor 569, diode 577, and past junction 583 and will also cause current to flow through controlled rectifier 585, past junction 581, through diode 575, through both sections of inductor 571, through diode 579, and past junction 583.

The standby A.C. power source will continue to supply power to the load 598 until the voltage of the normal A.C. power source again rises above the lower of its intended limits; and at that time the voltage at the terminal 242 of the voltage detector will again become positive relative to the voltage at the grounded terminal 236. Thereupon, the transistor 246 will again become conductive and the transistor 258 will again become non-conductive; and the resulting change in the electron current that flows from junction 140 through conductor 643, past junction 645, through resistor 615, through primary winding 617, past junction 248, through resistor 250, and past junction 252 to the terminal 138 will enable the secondary windings 621 and 625 to supply "firing" pulses to the gates of the controlled rectifiers 517 and 565. As the controlled rectifier 517 becomes conductive, the capacitors 566 and 596 will coact to apply a large inverse voltage to the controlled rectifier 547, and will thereby promptly render that controlled rectifier non-conductive. Thereafter, the normal A.C. power source will supply power to the load 598 and will charge the capacitor 566 while the standby A.C. power source charges the capacitor 596.

The inductors 501, 503, 531, 533, 549, 551, 569 and 571 not only serve to keep holding current flowing through the conductive controlled rectifiers, despite the alternations of the A.C. voltages supplied by the normal and standby A.C. power sources, but they also serve to limit the flow of cross currents during the transference of the load 598 from one of those power sources to the other. That limitation on the flow of cross currents is very desirable.

In the operation of the control system of FIG. 1, of the control system of FIG. 1 as it is modified by the substitution of the transfer unit of FIG. 2 or of the transfer unit of FIG. 3, and of the control system of FIG. 4, the load will be isolated from either the normal or the standby A.C. power source by at least one non-conductive controlled rectifier except during the transference period. That transference period will be quite short—being in the range of from one to three milliseconds—and hence the load will be isolated from either the normal or the standby A.C. power source by at least one non-conductive controlled rectifier for substantially all of the time. Further, during substantially all of the time, the load will be connected to one or the other of the power sources.

In the transfer unit of the control system of FIG. 1, the resistors 70, 74, 88 and 92 coact with the diodes 68, 76, 86 and 94 to provide paths through which current can flow to effect charging of the capacitors 66 and 96. Those resistors are needed to avoid the creation of "short circuiting" paths across the normal A.C. and standby A.C. power sources. For example, without the resistor 88, the following path would be a substantial "short circuit" for the normal A.C. power source: terminal 20, junctions 210, 196 and 28, diode 32, junction 58, controlled rectifier 34, junction 48, inductor 52, junction 56, inductor 54, junction 50, controlled rectifier 42, junctions 78 and 82, diode 86, junctions 90, 102, 198 and 212, and terminal 22. Similarly, without the resistor 70, the following path would be a substantial "short circuit" for the normal A.C. power source: terminal 22, junctions 212, 198, 102, 90, 100 and 72, diode 68, junctions 62 and 58, controlled rectifier 34, junction 48, inductor 52, junction 56, inductor 54, junction 50, controlled rectifier 42, junction 78, diode 40, junctions 28, 196 and 210, and terminal 20. Without the resistor 92, the following path would be a substantial "short circuit" for the standby A.C. power source: terminal 24, junctions 204 and 30, diode 38, junction 60, controlled rectifier 36, junction 48, inductor 52, junction 56, inductor 54, junction 50, controlled rectifier 44, junctions 80 and 84, diode 94, junctions 90, 102 and 202, and terminal 26. Similarly, without the resistor 74, the following path would be a substantial "short circuit" for the standby A.C. power source: terminal 26, junctions 202, 102, 90, 100 and 72, diode 76, junctions 64 and 60, controlled rectifier 36, junction 48, inductor 52, junction 56, inductor 54, junction 50, controlled rectifier 44, junction 80, diode 46, junctions 30 and 204, and terminal 24.

The resistors 385 and 387 of the transfer unit of FIG. 2 coact with the diodes 389 and 391 to provide charging paths for the capacitors 366 and 396, and yet prevent "short circuiting" of the standby A.C. power source. Without the resistor 385, the following path would be a substantial "short circuit" for the standby A.C. power source: terminal 26, junctions 202 102, 395 and 393, diode 389, junctions 381 and 360, controlled rectifier 336, junction 348, inductor 352, junction 356, inductor 354, junction 350, controlled rectifier 344, junction 380, diode 346, junctions 330 and 204, and terminal 24. Similarly, without the resistor 387, the following path would be a substantial "short circuit" for the standby A.C. power source: terminal 24, junctions 204 and 330, diode 338, controlled rectifier 336, junction 348, inductor 352, junction 356, inductor 354, junction 350, controlled rectifier 344, junctions 380 and 383, diode 391, junctions 393, 395, 102 and 202 and terminal 26.

The control systems provided by the present invention can transfer capacitive and inductive loads, and can transfer loads between power sources which are in phase or out of phase. Further, those control systems are unaffected by the power factor of the load or by any non-linear characteristics of the load.

In the drawing, the control systems are shown as they are used to transfer loads between single phase A.C. power sources. Where those control systems are to be used to transfer loads between polyphase A.C. power sources, a transfer unit will be connected between each phase of the normal A.C. power source and the corresponding phase of the standby A.C. power source. Also, where those control systems are to be used to transfer loads between polyphase A.C. power sources, "firing" signals will be applied to the controlled rectifiers of the various transfer units in such a way that the transfers provided by those various transfer units will occur simultaneously.

In the control systems of FIGS. 1 and 4, the detector which initiates the transference of the load from the normal A.C. power source to the standby A.C. power source is responsive to reductions in the voltage of that normal A.C. power source. Detectors could, however, be used which were responsive to increases in the voltage of either A.C. power source, or which were responsive to increases and decreases in the voltage of either A.C. power source. Further, detectors could be used which were responsive to over-frequency, to under-frequency, to combinations of frequency changes and voltage changes, or to any desired condition or command.

In the drawing, each of the transfer units provides automatic transference of the load from the normal A.C. power source to the standby A.C. power source. However, if desired, those transfer units could be used to provide manually controlled transference of the load from the normal A.C. power source to the standby A.C. power source. For example, a manual control could be used to halt the supplying of "firing" signals to the conductive controlled rectifiers and to initiate the supplying of "firing" signals to the non-conductive controlled rectifiers.

Once the control systems of FIGS. 1 and 4 have transferred the load from the normal A.C. power source to the standby A.C. power source, those control systems should not immediately transfer that load back to that normal A.C. power source, even if the voltage of that normal A.C. power source were to restore itself immediately. Instead, those control systems should delay any transfer of the load back to the normal A.C. power source until the standby A.C. power source has had an opportunity to adequately charge the capacitors 66 and 96 in FIG. 1 or the capacitors 566 and 596 in FIG. 4. That delay need only equal at least one full cycle of the A.C. voltage supplied by the standby A.C. power source; and proper selection of the values for the capacitors 272 and 274 of the bistable will enable that bistable to provide the required delay in the transferring of the load back to the normal A.C. power source.

The control systems provided by the present invention are ideally suited for use with A.C. circuits. However, those control systems could be used to transfer a load from a normal D.C. power source to a standby D.C. power source.

Whereas the drawing and accompanying description have shown and described several preferred embodiments of the present invention, it should be apparent to those skilled in the art that various changes may be made in the form of the invention without affecting the scope thereof.

What we claim is:

1. A control system that can normally connect a load to a first A.C. power source while isolating that load from a second A.C. power source and that can automatically and promptly transfer said load from said first A.C. power source to said second A.C. power source and can isolate said load from said first A.C. power source while substantially continuously supplying power to said load and that can subsequently automatically and promptly transfer said load from said second A.C. power source to said first A.C. power source and can isolate said load from said second A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected in generally parallel relation with said load and in series with the first said controlled rectifier whenever the first said controlled rectifier is conductive and that is connected in generally parallel relation with said load and in series with said second controlled rectifier whenever said second controlled rectifier is conductive, said capacitor storing energy therein as the first said controlled rectifier connects said load to said first A.C. power source and responding to rendering of said second controlled rectifier conductive to apply an inverse voltage to the first said controlled rectifier to render the first said controlled rectifier non-conductive, whereby the rendering of said second controlled rectifier conductive will automatically and promptly isolate said load from said first A.C. power source, said capacitor storing energy therein as said second controlled rectifier connects said load to said second A.C. power source and responding to rendering of the first said controlled rectifier conductive to apply an inverse voltage to said second controlled rectifier to render said second controlled rectifier non-conductive, whereby the rendering of the first said controlled rectifier conductive will automatically and promptly isolate said load from said second A.C. power source, an inductor that is connected to said controlled rectifiers to limit the flow of cross currents whenever said controlled rectifiers are simultaneously conductive, a signal source that can supply "firing" signals to the gate of the first said controlled rectifier or that can supply "firing" signals to the gate of said second controlled rectifier, and a detector that is responsive to the normal condition of said first A.C. power source to cause said signal source to supply "firing" signals to the gate of the first said controlled rectifier but that is responsive to a change in the condition of said first A.C. power source to cause said signal source to supply "firing" signals to the gate of said second controlled rectifier and that will respond to restoration of the said condition of said first A.C. power source to normal to again supply "firing" signals to the gate of the first said controlled rectifier.

2. A control system that can normally connect a load to a first A.C. power source while isolating that load from a second A.C. power source and that can automatiically and promptly transfer said load from said first A.C. power source to said second A.C. power source and can isolate said load from said first A.C. power source while substantially continuously supplying power to said load and that can subsequently automatically and promptly transfer said load from said second A.C. power source to said first A.C. power source and can isolate said load from said second A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected in generally parallel relation with said load and in series with the first said controlled rectifier whenever the first said controlled rectifier is conductive and that is connected in generally parallel relation with said load and in series with said second controlled rectifier whenever said second controlled rectifier is conductive, said capacitor storing energy therein as the first said controlled rectifier connects said load to said first A.C. power source and responding to rendering of said second controlled rectifier conductive to apply an inverse voltage to the first said controlled rectifier to render the first said controlled rectifier non-conductive, whereby the rendering of said second controlled rectifier conductive will automatically and promptly isolate said load from said first A.C. power source, said capacitor storing energy therein as said second controlled rectifier connects said load to said second A.C. power source and responding to rendering of the first said controlled rectifier conductive to apply an inverse voltage to said second controlled rectifier to render said second controlled rectifier non-conductive whereby the rendering of the first said controlled rectifier conductive will automatically and promptly isolate said load from said second A.C. power source, an inductor that is connected to said controlled rectifiers to limit the flow of cross currents whenever said controlled rectifiers are simultaneously conductive, and a signal source that can supply "firing" signals to the gate of the first said controlled rectifier or that can supply "firing" signals to the gate of said second controlled rectifier, said signal source normally supplying "firing" signals to the gate of the first said controlled rectifier but being responsive to a change in the condition of said first A.C. power source to supply "firing" signals to the gate of said second controlled rectifier.

3. A control system that can normally connect a load to a first A.C. power source while isolating that load from a second A.C. power source and that can automatically and promptly transfer said load from said first A.C. power source to said second A.C. power source and can isolate said load from said first A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected in generally parallel relation with said load and in series with the first said controlled rectifier whenever the first said controlled rectifier is conductive and that is connected in generally parallel relation with said load and in series with said second controlled rectifier whenever said second controlled rectifier is conductive, said capacitor storing energy therein as the first said controlled rectifier connects said load to said first A.C. power source and responding to the rendering of said second controlled rectifier conductive to apply an inverse voltage to the first said controlled rectifier to render the first said controlled rectifier non-conductive, whereby rendering of said second controlled rectifier conductive will automatically and promptly isolate said load from said first A.C. power souce, an inductor that is connected to said controlled rectifiers to limit the flow of cross currents whenever said controlled rectifiers are simultaneously conductive, and a signal source that can supply "firing" signals to the gate of the first said controlled rectifier or that can supply "firing" signals to the gate of said second controlled rectifier, said signal source normally being adapted to supply "firing" signals to the gate of the first said controlled rectifier but subsequently being adapted to supply "firing" signals to the gate of said second controlled rectifier.

4. A control system that can normally connect a load to a first A.C. power source while isolating that load from a second A.C. power source and that can transfer said load from said first A.C. power source to said second A.C. power source and can isolate said load from said first said A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected to the first said controlled rectifier and that is also connected to said second controlled rectifier, said capacitor being adapted to store energy therein while said load is connected to said first A.C. power source and responding to the rendering of said second controlled rectifier conductive to apply an inverse voltage to the first said controlled rectifier to render the first said controlled rectifier non-conductive, whereby the rendering of said second controlled rectifier conductive will automatically and promptly isolate said load from said first A.C. power source, an inductor that is connected to said controlled rectifiers, and a signal source that is normally adapted to supply "firing" signals to the gate of the first said controlled rectifier but that can subsequently supply "firing" signals to the gate of said second controlled rectifier.

5. A control system that can normally connect a load to a first power source while isolating that load from a second power source and that can transfer said load from said first power source to said second power source and can isolate said load from said first said power source and that comprises a controlled rectifier that will normally be rendered conductive to enable it to connect said load to said first power source but that can be selectively rendered non-conductive to isolate said load from said first power source, a second controlled rectifier that will normally be rendered non-conductive to enable it to isolate said load from said second power source but that can be selectively rendered conductive to connect said load to said second power source, a capacitor that is connected to the first said controlled rectifier and that is also connected to said second controlled rectifier, said capacitor being adapted to store energy therein and to respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source, and a signal source that can supply "firing" signals to the gate of the first said controlled rectifier or that can supply "firing" signals to the gate of said second controlled rectifier.

6. A control system that can normally connect a load to a first power source while isolating that load from a second power source end that can transfer said load from said first power source to said second power source and that comprises a controlled rectifier that will normally be rendered conductive to enable it to connect said load to said first power source but that can be selectively rendered non-conductive to isolate said load from said first power source, a second controlled rectifier that will normally be rendered non-conductive to enable it to isolate said load from said second power source but that can be selectively rendered conductive to connect said load to said second power source, and a capacitor that is connected to the first said controlled rectifier and that is also connected to said second controlled rectifier, said capacitor being adapted to store energy therein and to respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source.

7. A control system that can normally connect a load to a first power source while isolating that load from a second power source and that can transfer said load from said first power source to said second power source and that comprises a controlled rectifier that will normally be rendered conductive to enable it to connect said load to said first power source but that can be selectively rendered non-conductive to isolate said load from said first power source, a second controlled rectifier that will normally be rendered non-conductive to enable it to isolate said load from said second power source but that can be selectively rendered conductive to connect said load to said second power source, and a capacitor that is connected to the first said controlled rectifier and that is also connected to said second controlled rectifier, and a voltage source for said capacitor that is adapted to charge said capacitor so said capacitor can respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source.

8. A control system that can normally connect a load to a first power source while isolating that load from a second power source and that can transfer said load from said first power source to said second power source and that comprises a controlled rectifier that will normally be rendered conductive to enable it to connect said load to said first power source but that can be selectively rendered non-conductive to isolate said load from said first power source, a second controlled rectifier that will normally be rendered non-conductive to enable it to isolate said load from said second power source but that can be selectively rendered conductive to connect said load to said second power source, and a capacitor that is connected to the first said controlled rectifier and that is also connected to said second controlled rectifier, an inductor, and a charging circuit that includes said inductor and said capacitor and that will charge said capacitor, during the time the first said controlled rectifier is conductive, so said capacitor can respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source.

9. A control system that can normally connect a load to a first A.C. power source while isolating that load from a second A.C. power source and that can transfer said load from said first A.C. power source to said second A.C. power source and can isolate said load from said first said A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected to said controlled rectifiers, a diode, and a charging circuit that includes said capacitor and said diode and that will charge said capacitor, during the time the first said controlled rectifier is conductive, so said capacitor can respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source.

10. A control system that can normally connect a load to a first A.C. power source while isolating that load from a second A.C. power source and that can transfer said load from said first A.C. power source to said second A.C. power source and can isolate said load from said first said A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered non-conductive to enable it to isolate said load from said second A.C. power source but that can be selectively rendered conductive to connect said load to said second A.C. power source, a capacitor that is connected to said controlled rectifiers, and inductors that are connected to said controlled rectifiers to keep said controlled rectifiers conductive after said controlled rectifiers have been rendered conductive and until an inverse voltage is applied to said controlled rectifiers, said capacitor being adapted to store energy therein and to respond to the rendering of said second controlled rectifier conductive to apply an inverse voltage to the first said controlled rectifier to render the first said controlled rectifier non-conductive, whereby the rendering of said second controlled rectifier conductive will isolate said load from said first power source.

11. A control system that can normally connect a load to a first power source while isolating that load from a second power source and that can automatically and promptly transfer said load from said first power source to said second power source while substantially continuously supplying power to said load and that comprises a selectively conductive member that will normally be rendered conductive to enable it to connect said load to said first power source but that can be rendered non-conductive to isolate said load from said first power source, a second selectively conductive member that will normally be rendered non-conductive to enable it to isolate said load from said second power source but that can be rendered conductive to connect said load to said second power source, an energy-storing member that is connected to the first said selectively conductive member and that also is connected to said second selectively conductive member and that can store energy as the first said selectively conductive member connects said load to the first said power source, said energy-storing member responding to the rendering of said second selectively conductive member conductive to render the first said selectively conductive member non-conductive whereby the rendering of said second selectively conductive member conductive will automatically and promptly isolate said load from the first said power source, said energy-storing member responding to the rendering of the first said selectively conductive member conductive to render said second selectively conductive member non-conductive and to thereby automatically and promptly isolate said load from said second power source.

12. A control system that can normally connect a load to a first power source while isolating that load from a second power source and that can transfer said load from said first power source to said second power source and that comprises a selectively conductive member that will normally be rendered conductive to enable it to connect said load to said first power source but that can be rendered non-conductive to isolate said load from said first power source, a second selectively conductive member that will normally be rendered non-conductive to enable it to isolate said load from said second power source but that can be rendered conductive to connect said load to said second power source, an energy-storing member that is connected to the first said selectively conductive member and that also is connected to said second selectively conductive member and that can store energy, said energy-storing member responding to the rendering of said second selectively conductive member conductive to render the first said selectively conductive member non-conductive whereby the rendering of said second selectively conductive member conductive will isolate said load from the first said power source.

13. A control system that can normally connect a load to a first power source while isolating that load from a second power source and that can transfer said load from said first power source to said second power source and that comprises a selectively conductive member that will normally be rendered conductive to enable it to connect said load to said first power source but that can be rendered non-conductive to isolate said load from said first power source, a second selectively conductive member that will normally be rendered non-conductive to enable it to isolate said load from said second power source but that can be rendered conductive to connect said load to said second power source, an energy-storing member that is connected to the first said selectively conductive member and that also is connected to said second selectively conductive member and that can store energy, said energy-storing member responding to the rendering of said second selectively conductive member conductive to render the first said selectively conductive member non-conductive whereby the rendering of said second selectively conductive member conductive will isolate said load from the first said power source, said selectively conductive members being controlled rectifiers, said energy-storing member being a capacitor.

14. A control system that can normally connect a load to a first A.C. power source while isolating that load from a second A.C. power source and that can automatically and promptly transfer said load from said first A.C. power source to said second A.C. power source and can isolate said load from said first A.C. power source while substantially continuously supplying power to said load and that can subsequently automatically and promptly transfer said load from said second A.C. power source to said first A.C. power source and can isolate said load from said second A.C. power source while substantially continuously supplying power to said load and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered conductive to enable it to connect said load to said first A.C. power source but that can be selectively rendered non-conductive to isolate said load from said first A.C. power source, a third controlled rectifier that will normally be rendered non-conductive to enable it to isolate said load from said second A.C. power source but that can be selectively rendered conductive to connect said load to said second A.C. power source, a fourth controlled rectifier that will normally be rendered non-conductive to enable it to isolate said load from said second A.C. power source but that can be selectively rendered conductive to connect said load to said second A.C. power source, an inductor that has one terminal thereof connected between the first said and said third controlled rectifiers and that has the other terminal thereof connected between said second and said fourth controlled rectifiers, said inductor having a tap intermediate the said terminals thereof that is connectable to said load, a capacitor that is connected to the first said and said third controlled rectifiers, and a second capacitor that is connected to said second and said fourth controlled rectifiers, said capacitors being adapted to become charged in one direction while said first A.C. power source is connected to said load so said capacitors can respond to the rendering of said third and fourth controlled rectifiers conductive to render the first said and said second controlled rectifiers non-conductive, said capacitors being adapted to become charged in the opposite direction while said second A.C. power source is connected to said load so said capacitors can respond to the rendering of the first said and said second controlled rectifiers conductive to render said third and said fourth controlled rectifiers non-conductive.

15. A control system that can normally connect a load to a first A.C. power source while isolating that load from a second A.C. power source and that can transfer said load from said first A.C. power source to said second A.C. power source and that comprises a controlled rectifier that will normally be rendered conductive to enable it to connect said load to said first A.C. power source but that can be selectively rendered non-conductive to isolate said load from said first A.C. power source, a second controlled rectifier that will normally be rendered conductive to enable it to connect said load to said first A.C. power source but that can be selectively rendered non-conductive to isolate said load from said first A.C. power source, a third controlled rectifier that will normally be rendered non-conductive to enable it to isolate said load from said second A.C. power source but that can be selectively rendered conductive to connect said load to said second A.C. power source, a fourth controlled rectifier that will normally be rendered non-conductive to enable it to isolate said load from said second A.C. power source but that can be selectively rendered conductive to connect said load to said second A.C. power source, an inductor that has one terminal thereof connected between the first said and said third controlled rectifiers and that has the other terminal thereof connected between said second and said fourth controlled rectifiers, said inductor having a tap intermediate the said terminals thereof that is connectable to said load, a capacitor that is connected to the first said and said third controlled rectifiers, a second capacitor that is connected to said second and said fourth controlled rectifiers, and charging circuits for said capacitors that include said inductor, said capacitors being adapted to become charged in one direction while said first A.C. power source is connected to said load so said capacitors can respond to the rendering of said third and fourth controlled rectifiers conductive to render the first said and said second controlled rectifiers non-conductive, said capacitors being adapted to become charged in the opposite direction while said second A.C. power source is connected to said load so said capacitors can respond to the rendering of the first said and said second controlled rectifiers conductive to render said third and said fourth controlled rectifiers non-conductive.

16. A control system that can normally connect a load to a first A.C. power source while isolating that load from a second A.C. power source and that can automatically and promptly transfer said load from the first said A.C. power source to said second A.C. power source while substantially continuously supplying power to said load and that comprises a selectively conductive member that will normally be rendered conductive to enable it to connect said load to said first A.C. power source but that can be rendered non-conductive to isolate said load from said first A.C. power source, a second selectively conductive member that will normally be rendered non-conductive to enable it to isolate said load from said second A.C. power source but that can be rendered conductive to connect said load to said second A.C. power source, an energy-storing member that is connected to the first said selectively conductive member and that also is connected to said second selectively conductive member and that can store energy as the first said selectively conductive member connects said load to the first said A.C. power source, said energy-storing member responding to the rendering of said second selectively conductive member conductive to render the first said selectively conductive member non-conductive whereby the rendering of said second selectively conductive member conductive will automatically and promptly isolate said load from the first said A.C. power source, said energy-storing member responding to the rendering of the first said selectively conductive member conductive to render said second selectively conductive member non-conductive and thereby automatically and promptly isolating said load from said second A.C. power source.

17. A control system that can normally connect a load to a first A.C. power source while isolating that load from a second A.C. power source and that can automatically and promptly transfer said load from the first said A.C. power source to said second A.C. power source while substantially continuously supplying power to said load and that comprises a selectively conductive member that will normally be rendered conductive to enable it to connect said load to said first A.C. power source but that can be rendered non-conductive to isolate said load from said first A.C. power source, a second selectively conductive member that will normally be rendered non-conductive to enable it to isolate said load from said second A.C. power source but that can be rendered conductive to connect said load to said second A.C. power source, an energy-storing member that is connected to the first said selectively conductive member and that also is connected to said second selectively conductive member and that can store energy as the first said selectively conductive member connects said load to the first said A.C. power source, said energy-storing member responding to the rendering of said second selectively conductive member conductive to render the first said selectively conductive member non-conductive whereby the rendering of said second selectively conductive member conductive will automatically and promptly isolate said load from the first said A.C. power source, said energy-storing member responding to the rendering of the first said selectively conductive member conductive to render said second selectively conductive member non-conductive and thereby automatically and promptly isolating said load from said second A.C. power source, said selectively conductive members being controlled rectifiers, said energy-storing member being a capacitor.

18. A control system that can connect a load to a first A.C. power source and that can automatically and promptly transfer that load to a second A.C. power source, and that comprises a pair of control members power source, a pair of control members that are that are connectable to one terminal of said first A.C. power sources, a pair of control members that are connectable to one terminal of said second A.C. power source, said control members being selectively rendered conductive and being selectively rendered non-conductive, a signal source that normally renders the first said pair of control members conductive while permitting said second pair of control members to remain non-conductive, said signal source being adapted to respond to a predetermined condition to render said second pair of control members conductive, and an impedance that responds to the flow of current through the first said pair of control members to store energy, said impedance responding to the rendering of said second pair of control member conductive to render the first said pair of control members non-conductive, whereby said load will be automatically and promptly transferred from said first A.C. power source to said second A.C. power source and will be disconnected from said first A.C. power source.

19. A control system that can connect a load to a first A.C. power source and that can automatically and promptly transfer that load to a second A.C. power source, and that comprises a pair of control members that are connectable to one terminal of said first A.C. power source, a pair of control members that are connectable to one terminal of said second A.C. power source, said control members being selectively rendered conductive and being selectively rendered non-conductive, a signal source that normally renders the first said pair of control members conductive while permitting said second pair of control members to remain non-conductive, said signal source being adapted to respond to a predetermined condition to render said second pair of control members conductive, and an impedance that responds to te flow of current through the first said pair of control members to store energy, said impedance responding to the rendering of said second pair of control members conductive to render the first said pair of control members non-conductive, whereby said load will be automatically and promptly transferred from said first A.C. power source to said second A.C. power source and will be disconnected from said first A.C. power source, said impedance including an inductor that is connected between said one terminal of said first A.C. power source and said one terminal of said second power source by said control elements and that can minimize the flow of cross current during the tarnsference of said load from said first A.C. power source to said second A.C. power source.

20. A control system that can connect a load to a first A.C. power source and that can automatically and promptly transfer that load to a second A.C. power source, and that comprises a pair of control members that are connectable to one terminal of said first A.C. power source, a pair of control members that are connectable to one terminal of said second A.C. power source, said control members being selectively rendered conductive and being selectively rendered non-conductive, a signal source that normally renders the first said pair of control members conductive while permitting said second pair of control members to remain non-conductive, said signal source being adapted to respond to a predetermined condition to render said second pair of control members conductive, and an impedance that responds to the flow of current through the first said pair of control members to store energy, said impedance responding to the rendering of said second pair of control members conductive to render the first said pair of control members non-conductive, whereby said load will be automatically and promptly transferred from said first A.C. power source to said second A.C. power source and will be disconnected from said first A.C. power source, said impedance including a capacitor, said control elements being controlled rectifiers.

References Cited by the Examiner

UNITED STATES PATENTS

| | | | |
|---|---|---|---|
| 2,659,036 | 11/53 | Needham et al. | 307—64 |
| 2,977,523 | 3/61 | Cockrell | 307—88.5 |
| 3,002,105 | 9/61 | Cady | 307—64 |
| 3,026,455 | 3/62 | Smith | 317—149 |
| 3,036,220 | 5/62 | Latimer | 307—58 |

LLOYD McCOLLUM, *Primary Examiner.*

SAMUEL BERNSTEIN, *Examiner.*